April 13, 1937.  J. L. CREVELING  2,077,040
LUBRICATION DEVICE
Filed Sept. 17, 1931
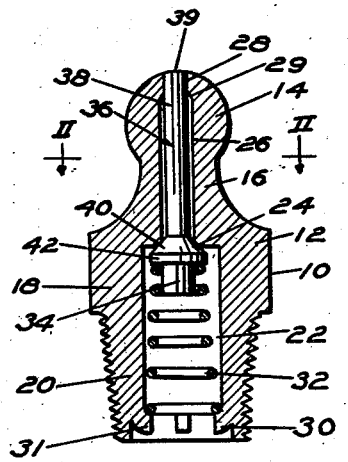
Fig. 1
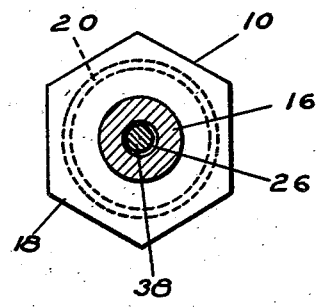
Fig. 2
Fig. 3
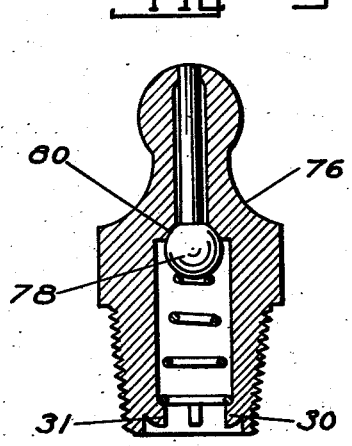
Fig. 4
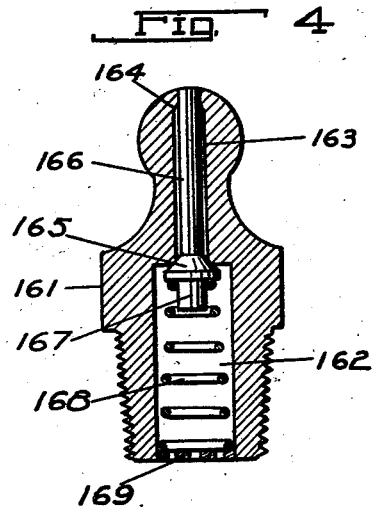
INVENTOR.
JOHN L. CREVELING
BY McConkey + Booth
ATTORNEYS.

Patented Apr. 13, 1937

2,077,040

UNITED STATES PATENT OFFICE 2,077,040

LUBRICATION DEVICE

John L. Creveling, Tucson, Ariz., assignor to The Lubrication Corporation, South Bend, Ind., a corporation of Delaware Application September 17, 1931, Serial No. 563,409

6 Claims. (Cl. 184—105)

This invention relates to lubrication devices and is more particularly concerned with fittings adapted to be fixedly secured to bearings or other parts of machinery which it is desired to lubricate. Even more specifically, it relates to fittings of the type in which a ball head is provided whereby a lubricant coupler may be operatively joined to the fitting at substantially any desired angle relative to the fitting, although certain features are applicable to pin and other fittings.

Fittings of this general type are disclosed in a prior patent to Morris No. 1,749,830. In some respects the embodiments of my invention disclosed in this application represent improvements over the devices disclosed in said patent, and in other respects a wide departure therefrom.

Fittings of the type disclosed in the patent to Morris have many valuable advantages over fittings previously in use. For instance, such fittings are capable of being used most efficiently either with nozzles of the contact type or with nozzles of the grab or clamp type. In the servicing of the Morris type fittings by means of a nozzle of the contact type it is possible on account of the smooth, spherical surface of the fitting to secure a lubricant tight seal throughout a wide, almost universal, range of angles. Moreover, in the servicing of such a fitting with the grab type of nozzle, portions of the ball form an abutment against which claws of a nozzle may come into relative contact to urge the nozzle firmly into sealing relationship with the fitting. In order to obtain the above mentioned as well as other advantages of the Morris type fitting, it is necessary that the surface of the ball head of the fitting should be exactly spherical, and it is important to note here that a rounded head or a head having rounded surfaces is not satisfactory to obtain the almost universal range of contacts or sealing engagements possible with the contact type of nozzle and with the grab type of nozzle unless the surface is exactly spherical. Moreover, it is important to notice that the ball head of the fitting should in all practical embodiments have a spherical surface of more than one-half of a sphere in order that the grab type of nozzle may make a sealing connection through a wide range of angles and in order that the grab type of nozzle may be firmly engaged with the fitting. By reason of the advantages mentioned above among others, development of the ball head fitting of the Morris type is very important and this application relates generally to such fittings and to methods of manufacture thereof.

One of the objects of this invention is to provide a fitting of the above stated type relatively inexpensive to manufacture and yet adequately satisfactory in practical operation.

A further object of the invention is to provide a fitting of the above stated characteristics capable of withstanding hard usage and continuing to operate efficiently.

A further object of the invention is the provision of a peculiar type of valve adapted to coact with the casing to form a simple and efficient closure therefor.

Further objects will be apparent from a reading of the subjoined specification and claims and from a consideration of the accompanying drawing.

In order to explain the invention more clearly several embodiments thereof are shown in said drawing, in which:

Figure 1 is an axial section of one embodiment of the invention;

Figure 2 is a section on the line II—II of Figure 1;

Figure 3 is an axial section of another embodiment of the invention; and

Figure 4 is an axial section of still another embodiment of the invention.

Referring particularly to the fitting generally designated 10 shown in Fig. 1, it may be seen that there is provided a main body 12 which is formed with a head 14 of substantially spherical contour, a reduced neck portion 16, an enlarged hexagonal wrench receiving portion 18, and a reduced and slightly tapering externally screw threaded portion or shank 20. The fitting has a plurality of concentric bores of differing diameters drilled through it. It has the bore 22 extending through the shank portion 20 and into the portion 18, and at the inner end of the bore 22, an annular shoulder forms the valve seat 24. A reduced bore 26 extends from the valve seat through the neck and into the head, and a still further reduced bore 28 extends through to the exterior of the head, the two bores being connected by an annular sloping shoulder 29. The bores being aligned, they may be said to form, in effect, a single stepped bore.

The lower end of the bore 22 has a seat formed by several (preferably three or four) spaced projections such as 30 and 31, and upon this seat there rests a helical spring 32. The upper end of the spring 32 surrounds a tail or guide rod 34 of the valve member generally designated 36. The valve member comprises in addition to the tail rod 34 an upwardly extending guide rod 38, and a conical portion or valve 40 which is adapted to seat upon the valve seat 24, and the guide rods 34 and 38 thus form a pair of oppositely extending stems for the valve 40. The conical portion 40 is provided with a shoulder 42 against which the upper end of the spring 32 bears. The guide rod 38 has its upper end 39 formed as a zone of a sphere with the center coinciding with the center of the ball head 14 and when the valve is seated said upper end is substantially flush with the ball head.

In describing the forms of my invention which differ from the form shown in Figs. 1 and 2, I will designate substantially similar parts by like numerals, describing in detail only those parts which differ from the parts of the fitting shown in Figs. 1 and 2.

A fitting generally designated 76 shown in Fig. 3 differs from the fitting 10 only in that the valve member is formed with a ball valve 78 in lieu of the beveled portion 24, and the valve seat 80 is formed with a concave surface to cooperate with the shape of the ball 78. The valve member, however, is provided with no tail rod such as the tail rod 34 shown in Fig. 1.

In Fig. 4 is shown a fitting 161 constructed to a large extent like the fitting 10. The body has bores 162, 163, and 164 and the valve member has a conical portion 165, and oppositely extending stems 166 and 167. The latter is surrounded by a spring 168 which rests upon a perforated plate 169 which is similar to the plate 72. In addition to other functions, the plate 169 forms a stop for the stem 167 and prevents the spring 168 from buckling.

It is to be understoood that the above described embodiments are for the purpose of illustration only and various changes may be made therein without departing from the spirit and scope of my invention.

I claim:

1. A lubricant fitting comprising a ball head, a reduced neck, and a supporting shank, and having a plurality of concentric cylindrical bores formed longitudinally through said shank, said neck, and said head, the bores having their maximum diameter within said shank and presenting a relatively short portion of minimum diameter adjacent to the outer end of said head connected by a portion of 'ntermediate diameter, and a valve member in said bore of maximum diameter having a stem extending through said portions of intermediate and minimum diameter of such length that its end lies substantially flush with the head surface when the valve is closed.

2. A lubricant fitting comprising a body having a ball head, a reduced neck, a hexagonal wrench receiving portion, and a threaded shank, said body being formed with a relatively large bore extending inward axially of said fitting from the shank end, with a relatively small bore extending inward axially of said fitting from the ball head end, with a bore of intermediate diameter connecting said two first mentioned bores, and with an annular shoulder formed between said large and intermediate bores; and a valve member in said bores comprising a relatively large body portion resting upon said annular shoulder, and an outwardly extending stem connected to said body portion and extending outward through said small bore.

3. A lubricant fitting comprising a ball head, a reduced neck, a wrench receiving portion, and a threaded shank; and having three concentric bores formed longitudinally through said shank, said neck, and said head, the bore having the maximum diameter being adjacent to the inner end in said shank and the bore having the minimum diameter being relatively short in length and adjacent to the outer end in said head; and a valve positioned in said bores having an enlarged portion positioned in the bore of maximum diameter and having an outwardly extending stem projecting outward through the bore of intermediate diameter in the ball head of said fitting into the bore of minimum diameter.

4. A lubricant fitting comprising a body formed with a ball head; a constricted neck; an enlarged hexagonally shaped portion by which said fitting may be gripped; and an exteriorly threaded shank portion, said body being formed with a plurality of aligned concentric bores, adjacent bores having shoulders formed between, the bore extending through said shank portion having a larger diameter than the other said bores, and the bore extending outward through said ball head having a smaller diameter than said other bores; a valve member positioned within said bores, said valve member being formed with an enlarged conical portion adapted to seat upon the shoulder between said large bore and the next smaller one and having a stem projecting through one of said bores and normally extending through said ball head into said small bore and having a second projecting stem aligned with but extending oppositely from said first named stem; and a spring surrounding said last named stem and bearing upon said enlarged portion for normally maintaining said valve closed.

5. A lubricant fitting comprising a body having a ball head and formed with three concentric bores of different diameters, a shoulder being formed between the large diameter bore and intermediate diameter bore serving as a valve seat, a valve positioned within one of said bores comprising a ball adapted to seat upon said valve seat, a valve stem secured to said ball and extending normally through said intermediate diameter bore into said small diameter bore, and a spring bearing upon said ball for resiliently maintaining said ball normally upon said seat.

6. A lubricant fitting comprising a body having at one end a small inlet port and at its other end an enlarged valve chamber and a cylindrical bore of intermediate diameter connecting said port and chamber a relatively short conical shoulder connecting said bore to the inlet port, a valve seat formed within the confines of said valve chamber, a valve within said chamber having a body of less diameter than the diameter of said chamber, resilient means urging the valve upon its seat, and a valve stem on the valve of substantially the same length as the distance between said valve seat and inlet port and extending through said intermediate bore whereby when the valve is seated the outer end of said stem will be substantially flush with the outer wall of the nipple at the inlet port.

JOHN L. CREVELING.